United States Patent [19]

Kosh

[11] Patent Number: 5,049,421
[45] Date of Patent: Sep. 17, 1991

[54] TRANSDUCER GLASS BONDING TECHNIQUE

[75] Inventor: William S. Kosh, Shelton, Conn.

[73] Assignee: Dresser Industries, Inc., Dallas, Tex.

[21] Appl. No.: 304,358

[22] Filed: Jan. 30, 1989

[51] Int. Cl.$^5$ .............................................. A47G 19/22
[52] U.S. Cl. ..................................... 428/34.4; 29/595;
73/718; 116/268; 156/87; 156/153; 156/286;
156/295; 156/307.3; 156/330.9; 156/331.1;
428/34.7; 428/435; 428/473.5
[58] Field of Search ................... 156/307.3, 330.9, 153,
156/286, 331.1, 295, 87; 428/473.5, 34.4, 34.7,
435; 73/718; 116/268; 29/595; 108/150

[56] References Cited

U.S. PATENT DOCUMENTS

| | | |
|---|---|---|
| 3,232,114 | 6/1962 | Ferran . |
| 3,800,264 | 3/1974 | Kurtz et al. . |
| 3,821,072 | 6/1974 | Campbell et al. ................. 156/331.1 |
| 4,019,388 | 4/1977 | Hall, II et al. . |
| 4,065,345 | 12/1977 | Progar et al. . |
| 4,094,862 | 6/1978 | Bell . |
| 4,129,042 | 12/1978 | Rosvold . |
| 4,168,630 | 9/1979 | Shirouzu et al. . |
| 4,188,258 | 2/1980 | Mounteer et al. . |
| 4,196,632 | 4/1980 | Sikorra . |
| 4,216,401 | 8/1980 | Wagner . |
| 4,244,228 | 1/1981 | Lehnhardt . |
| 4,277,814 | 7/1981 | Giachino et al. . |
| 4,287,772 | 9/1981 | Mounteer et al. . |
| 4,303,903 | 12/1981 | Matsuoka et al. . |
| 4,314,225 | 2/1982 | Tominaga et al. . |
| 4,322,980 | 4/1982 | Suzuki et al. . |
| 4,325,260 | 4/1982 | Takahashi et al. . |
| 4,542,435 | 9/1985 | Freud et al. . |
| 4,543,295 | 9/1985 | St. Clair et al. . |
| 4,716,492 | 12/1987 | Charboneau et al. . |
| 4,842,949 | 6/1989 | Gagliani et al. ................. 428/473.5 |

FOREIGN PATENT DOCUMENTS 1011188 5/1977 Canada ................................ 156/286

OTHER PUBLICATIONS

Neat Resin and Composite Properties of Durimid TM High Temperature Thermoplastic Polyimides, David C. Sherman, Che-Yang Chen and Jane L. Cercena, 33, International Sampe. Symposium, Mar. 7-10, 1988.
Durimid TM Thermoplastic Polyimide 100 and 120 Preliminary Data Sheet, Rogers Corporation (Advertisement Undated).

Primary Examiner—John J. Gallagher
Attorney, Agent, or Firm—Richards, Medlock & Andrews

[57] ABSTRACT

A polyimide adhesive is applied in liquid form between surfaces of a pressure transducer glass surface and a glass pedestal tube and maintained at room temperature, or below, for a period of 10-15 hours to allow the adhesive solvent to evaporate. After such time, the temperature of the transducer and attached pedestal tube is elevated over a period of time to about 320° C. to completely imidize the polyimide adhesive. The pedestal is then fixed within an opening in a base portion of a case, and electrical conductors are connected between pins in the case and transducer contacts. A cover is hermetically sealed to the case to thereby encase the transducer.

41 Claims, 2 Drawing Sheets

TRANSDUCER GLASS BONDING TECHNIQUE

TECHNICAL FIELD OF THE INVENTION

The present invention relates in general to bonding structures and techniques, and more particularly to bonding techniques for securing glass and metal interface surfaces together.

BACKGROUND OF THE INVENTION

The fabrication and assembly of most apparatus, equipment and devices entail the fastening or fixing of various parts together for securing the same as a unit. In many cases, various fastening techniques are available, one or more of which may be selected because of expediency, cost or availability. However, in other instances, the fastening together of elements can be reliably achieved only after numerous critical factors have been considered, such as the types of materials, the thermal expansion characteristic of the materials, the temperatures and ranges which the devices will experience, the adhering or bonding technique, vibration, long term stability, electrical conductivity and other concerns.

Transducers comprise a type of apparatus which involves numerous assembly considerations due to the concerns noted above. Particularly, balanced differential pressure transducers, of the capacitance displacement type, are fabricated with a sandwiched glass and silicon structure with metallized conductive surfaces, the assembly of which is packaged in a metal case. Pressure conduits must be provided for allowing pressure differentials to act upon a transducer silicon diaphragm. Also, electrical conductors must be provided external to the case for sensing capacitance changes of the transducer diaphragm. In addition, the transducer wafer structure itself must be supported within the case in such a manner as to allow the noted pressure and electrical connections thereto, as well as a support for securing the transducer structure within the case. Because such type of devices are typically utilized in an environment in which broad temperature excursions may be experienced, and in which the device may be required to withstand substantial vibrations, the assembly of such a structure can present numerous technical problems which must be overcome to assure a highly reliable device.

Some of the considerations and concerns which must be addressed during the assembly of a multi-element structure, such as the foregoing, are the thermal expansions properties of different materials with which, if not considered, can crack or break the transducer-enclosure interface connections and destroy the device. Also, and especially in capacitive sensitive devices, the type of interface and bonding of parts together must be considered so that stray capacitance is minimized, and does not change over the life of the transducer.

Recent developments in the polymer area have given rise to the availability of high temperature polyimide resins which exhibit excellent bonding properties. Polyimide film laminates have been employed in space vehicles with a great deal of success. Polyimide naterials and bonding techniques are disclosed in U.S. Pat. Nos. 4,065,345, 4,094,862 and 4,543,295. The disclosures of these patents, which are incorporated herein by reference, relate to the development of the LARC-TPI bonding technology by the National Aeronautics and Space Administration.

Conventional processing techniques for bonding or adhering surfaces together with polyimide resins include the steps of spreading a thin layer of the liquid polyimide material on a film or solid surface, and heating the coated material to a high temperature to drive off the solvent and completely imidize the polyimide material. The initial heating step drives off all the solvent in the polyimide adhesive so that bubbles do not form during subsequent processing steps. Curing of the polyimide is accomplished by continuing to increase its temperature, forming imide rings along the polymer structure, thus yielding good mechanical properties and still being thermoformable. After complete imidizing of the polyimide adhesive, another material or laminate layer is pressed onto the imidized polyimide adhesive. The laminate, structure is then heated under pressure to form a thermoplastic bond. It can be appreciated that if voids, bubbles or blisters form in the polyimide adhesive, an incomplete or nonuniform bonding interface is formed which is more easily stressed or broken.

From the foregoing, it can be seen that a need exists for an improved technique to assemble and fix a transducer wafer assembly within a sealed enclosure to provide a cost effective and reliable device. Another need exists for a technique to bond or adhere a glass part of the transducer wafer assembly to a support structure such that temperature, vibration and other affects are minimized.

SUMMARY OF THE INVENTION

In accordance with the invention, there is disclosed a transducer packaging technique which reduces or substantially eliminates the problems and disadvantages encountered by prior art techniques. According to the invention, a metallized surface of a trilevel transducer wafer assembly is bonded to a glass pedestal tube which, in turn, is fixed to a metal case. The pedestal tube is bonded to an apertured part of the transducer wafer assembly so as to provide a fluid conduit between the opening in the transducer wafer assembly and the exterior of the transducer case.

In the preferred form of the invention, a Durimid ® 120 polyimide bonding adhesive is applied in liquid form at room temperature or below to the end of the pedestal tube. The glass transducer wafer is then pressed onto the pedestal tube end and allowed to stand at a temperature of about 5° C. for about 10–15 hours, or a time sufficient to allow the solvent of the bonding material to naturally diffuse through the adhesive layer and evaporate. Because the adhesive is yet in liquid form when the parts are pressed together, a fillet of adhesive is formed between the parts. Then, the temperature is elevated at prescribed temperature increments for predefined periods of time until the bonding material cures in a thermoplastic state. Preferably, the ramped increase in temperature comprises a change of 50° C. to 315° C. over a period of approximately 8 hours. As a result, the transducer wafer assembly is firmly bonded to the glass pedestal tube. The bond can withstand extreme pressure and temperature variations, vibration, and provides an excellent interface between the glass structures which minimizes stray or parasitic capacitances associated with the transducer, and has long term stability and readily accepts a conductive path.

A metal socket adapter is fastened within a header base portion of a T0-8 type case, and the glass pedestal is fixed therein by a silicone type adherent. Conductors are then bonded between the contact surfaces of the transducer wafer assembly and isolated feed through pins of the T0-8 case. A cover of the case can be resistance welded to the header in predefined atmospheric conditions to thereby seal the transducer wafer assembly in a vacuum condition within the case. Alternatively, another inlet conduit can be fixed within a hole in the header for allowing dual fluids to coact with the transducer wafer assembly and produce corresponding output capacitances. With the foregoing structure, the T0-8 case can be fixed within a socket structure and connected to flexible tubing for sensing fluid pressure differentials. The capacitance change of the transducer, in response to the changes in fluid pressure, can be sensed by connecting circuits or sensing equipment to the terminal pins of the packaged transducer.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts or elements throughout the views, and in which.

DETAILED DESCRIPTION OF THE INVENTION

Figure 1:
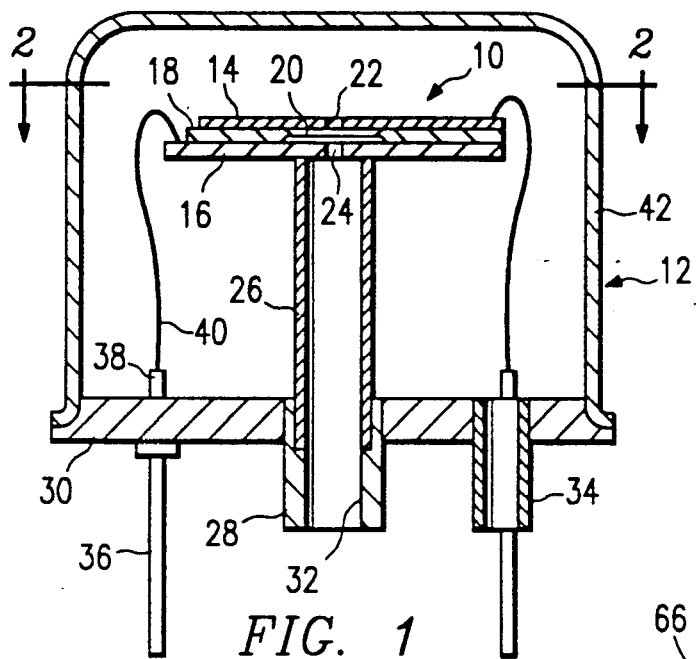
FIG. 1 is a cross-sectional view of a packaged miniature transducer, assembled in accordance with the invention.

FIG. 1 illustrates an application in which the techniques of the invention can be advantageously practiced. While the noted application is only exemplary of the preferred assembly technique of the invention, many other applications and variations of the invention may be realized by those skilled in the art.

Shown in FIG. 1 is a cross-sectional view of a pedestal-mounted transducer assembly or chip 10 housed within a conventional T0-8 type case 12. The transducer 10 is of a capacitive displacement type constructed as a three layer composite structure, including a top glass substrate 14, a bottom glass substrate 16 and a silicon material 18 having formed therein a clamped ultrathin diaphragm 20. Holes 22 and 24 are formed within the top and bottom glass substrates 14 and 16 for allowing fluid pressures to coact with the diaphragm 20 and provide an output change in capacitance. The change in capacitance can be correlated by way of an electrical circuit (not shown) to corresponding fluid pressure changes, thereby providing a transducer for converting changes in pressure into corresponding output electrical signals. The trilevel transducer assembly 10 is described in detail in copending U.S. Application entitled "High Sensitivity Miniature Pressure Transducer," filed concurrently herewith, Ser. No. 304,344. Electrical circuits suitable for converting the changes in capacitance into corresponding electrical signals are described in copending U.S. Patent Application entitled "Precision Transducer Circuit and Linearization Method", filed concurrently herewith, bearing Ser. No. 304,359. The subject matter of both applications are incorporated herein by reference.

The composite trilevel transducer 10 is miniature, being about 300 mils square, and having an ultrathin membrane diaphragm 20 which can sense changes in pressure as small as 0.0001 inches of water. As can be appreciated, the transducer assembly 10 is extremely sensitive to changes in pressures, thereby fulfilling a need in the pressure sensing area. Because the miniature trilevel composite transducer 10 is ultrasensitive to pressures, the structure thereof is also responsive to external stresses and loads which can be coupled to the diaphragm membrane 20 and produce corresponding minute changes in the diaphragm position, thereby providing output responses which are not caused by pressure. This, of course, represents an error or inaccuracy and, if substantial, represents a compromise in the quality and reliability of the transducer. This sensitivity can be appreciated in view that diaphragm deflections of only a fraction of a micron caused by either pressure changes or by structural load or stress changes, result in output capacitance changes which are transformed into corresponding electrical signals.

In order to render the 300 mil square trilevel transducer assembly 10 as independent as possible from support structure loads or stress, the assembly 10 is mounted on a 3mm glass pedestal tube 26 to the case 12. The pedestal tube 26 has a sidewall thickness of approximately 0.5mm. The pedestal 26 comprises a glass tube which communicates fluids from outside the transducer case 12 to the diaphragm 20, via the transducer bottom hole 24, thereby allowing the diaphragm 20 to deflect in response to pressure changes. The transducer assembly 10 is bonded to the pedestal tube 26 in accordance with the techniques of the invention. With this construction, radial and axial stresses imposed on the trilevel transducer assembly 10 by the support structure are minimized, thereby improving the accuracy of the transducer 10, both short term and long term.

The pedestal tube 26 is bonded with a silicone adhesive within a tubular metal socket 28 which, in turn, is adhered or brazed within a header base 30 of the case 12. The socket 28 includes an annular shouldered area 32 such that the pedestal tube 26 can be fitted within the socket 28 and bottomed out against the annular shoulder 32. A second metal conduit 34 is hermetically sealed or welded within the header 30 to provide an exchange of other fluids from the outside of the transducer case 12 to the inside. The fluids within the transducer case 12 are isolated from the fluids communicated by way of the pedestal tube 26, whereby the differential of such fluids can cause a deflection of the transducer diaphragm 20.

Electrical connections to contacts on the trilevel transducer assembly 10 are accomplished by way of feed through pins, such as 36, sealed by an insulating glass (not shown) within the header 30. An end 38 of the pin 36 is accessible within the transducer case 12 such that a wire conductor 40 can be bonded to the pin end 38, looped somewhat, and then bonded to a contact on the transducer 10. Other transducer contacts and case pins are similarly connected together. The wire conductors 40 are looped to prevent the trilevel transducer assembly 10 from being tensioned by the connecting conductors 40.

A cover 42 is bonded or otherwise fixed, such as by resistance welding, to the header 30 to provide a hermetic seal for encasing the trilevel transducer assembly 10 therein. The only fluids which can coact with the transducer membrane 20 are those which are communicated via the tubular socket 28 or the conduit 34. In the preferred form of the invention, plastic tubing can be connected to the tubular members 28 and 34 for exposing the trilevel transducer assembly 10 to differential fluid pressures so that changes therein can be sensed.

Figure 2:
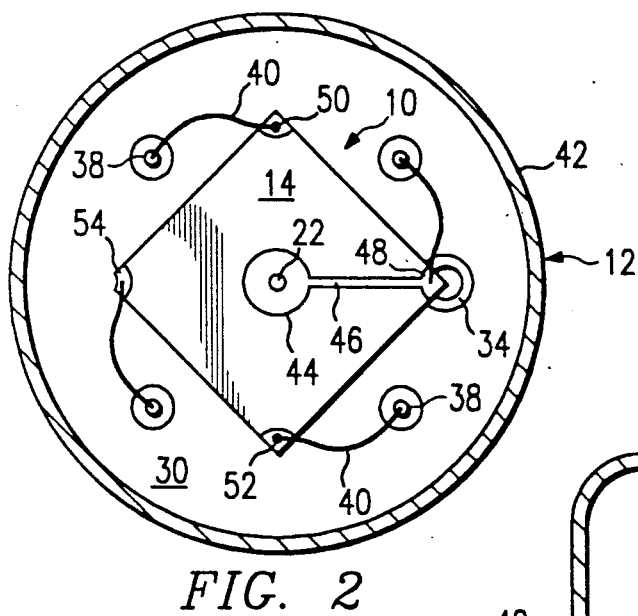
FIG. 2 is a sectional top view of the packaged transducer, taken along line 2—2 of FIG. 1.

FIG. 2 illustrates a top sectional view of the encased transducer shown in FIG. 1. The top of the trilevel transducer assembly 10 includes a central metallized land area 44 with a hole 22 for allowing fluids to coact within the diaphragm 20, formed as part of the intermediate silicon wafer 18. The conductive land 44 is electrically connected by a conductive via formed in the hole 22 to a capacitor plate (not shown), formed on the under surface of the top glass substrate 14. The conductive land area 44 is also connected by a conductor 46 to a corner contact 48. A wire can be bonded to the corner contact 48 and to one of the feed through pins for achieving an electrical connection to the top capacitor plate which is separated from the diaphragm 20 by a very small gap. Diagonally disposed contacts 50 and 52 are formed at the corners of the silicon wafer 18, thereby providing electrical access thereto. Again, electrical conductors can be bonded to the corner contacts 50 and 52 to provide electrical connections to the diaphragm 20. While only one external connection to the silicon diaphragm 20 is required for sensing a change in capacitance, a second connection is provided so that the resistance of the silicon can be measured. In this manner, the temperature of the device can be monitored.

A top side contact surface 54 is formed on the bottom glass substrate 16 for providing top side electrical contact thereto. The top side contact 54 has a conductive path formed around the edge of the bottom glass wafer 16 and to a land area on the bottom of the bottom glass substrate 16. The land area is connected to a conductive via formed through the hole 24, in electrical contact with a bottom capacitor plate formed on the top side of the bottom glass substrate 16 and spaced by a very small gap from the diaphragm 20. The trilevel transducer assembly 10 is thus provided with electrical access to the various elements, from a single side thereof, for sensing capacitance changes.

Figure 3:
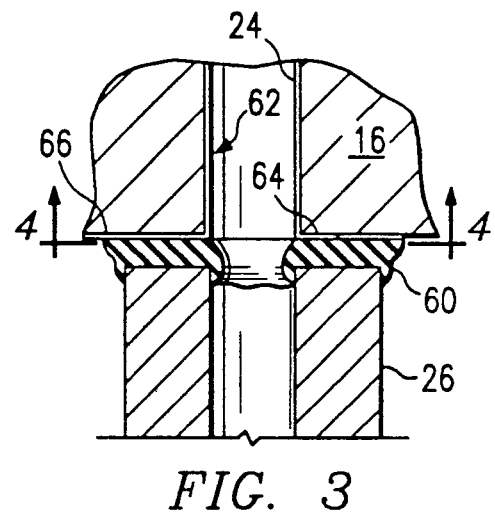
FIG. 3 is a much enlarged cross-sectional view of the bonded interface between the transducer wafer assembly and the pedestal tube, bonded according to the techniques of the invention.
Figure 4:
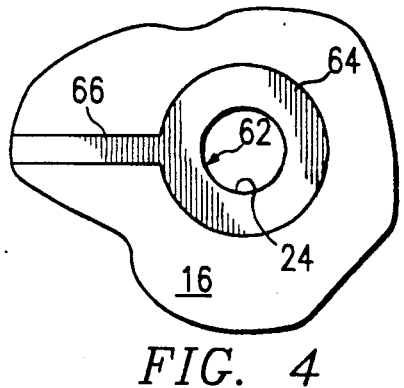
FIG. 4 is a view of a bottom portion of the transducer wafer assembly, taken along line 4—4 of FIG. 3.

In accordance with an important feature of the invention, the pedestal tube 26 is bonded to the trilevel transducer assembly 10 in such a manner as to minimize thermal and structural stresses on the transducer structure 10. FIG. 3 depicts an enlarged view of the bonding interface between the pedestal tube 26 and the trilevel transducer assembly 10. Particularly, shown is an upper end of the pedestal tube 26 bonded by a high temperature thermoplastic polyimide resin 60 to the apertured surface of the bottom glass substrate 16. Specifically shown in FIGS. 3 and 4 is the conductive via 62 formed in the hole 24 of the bottom glass substrate 16. Formed integral with the conductive via 62 is the bottom land area 64 and a conductive path 66 which extends to a corner of the bottom glass substrate 16, and is formed around an edge thereof in electrical contact with the top surface contact 54. Preferably, and in keeping with conventional semiconductor deposition materials and techniques, the conductive material deposited on the various surfaces of the bottom glass substrate 16 comprises aluminum. Therefore, the thermoplastic material 60 preferably should provide excellent bonding between the glass material of the pedestal tube 26, the glass material of the bottom substrate 16, and the conductive aluminum deposits comprising the land area 64 and the conductive path 66. As noted in FIG. 3, the bonding material 60 forms fillets to the sidewalls of the pedestal tube 26 for an enhanced bond.

In the preferred form of the invention, the bottom glass substrate 16 and the pedestal tube 26 are constructed of the same material so that thermal coefficients of expansions are matched and both such structures track each other during temperature changes. A Corning 7740 borosilicate glass is suitable for use as the glass components. Also, it is highly preferable that a bond be achieved between the glass pedestal 26 and the glass substrate 16 such that if the deposited metal of the land area 64 or the path 66 becomes separated form the glass substrate 16, the two glass interfaces remain firmly bonded together According to the invention, the transducer assembly 10 is bonded to the pedestal tube 26 with a polyimide resin cured to form a thermoplastic material.

The bonding step is carried out by first polishing the annular end of the pedestal tube 26 with a fine abrasive to achieve an orthogonal end surface, as well as a highly polished and clean surface to facilitate bonding thereto. The pedestal tube 26 and the trilevel transducer assembly 10 are then cleaned with a suitable solvent solution, such as Freon PCA, and processed in a clean room environment according to the following steps. The polished end of the pedestal tube 26 is dipped into a polyimide resin liquid composed of 3, 3' -diaminobenzophenone (DABP) reacted with a 3, 3', 4, 4'-benzophenone tetra-carboxylic acid dianhydride (BTDA) to form a polyamic acid An adhesive suitable for use with the invention is disclosed in U.S. Pat. No. 4,094,862. The polyamic acid can be then thermally or chemically imidized to produce the high temperature thermoplastic polyimide. The noted polyimide resin is commercially available from Rogers Corporation, Rogers, Conn. under the trademark Durimid 120.

Preferably, the polyimide resin is obtainable as 25% solid and 75% diglyme solvent. A readily available silane adhesion promoter is then mixed, one percent by weight of the polyimide solid, to the polyimide resin to form the bonding compound The silane adhesion promotor may be obtainable from PCR, Inc., Gainesville, Florida, under the trademark Prosil 9215. The adhesion promoter is a silane coupling agent which effectively promotes adhesion to various substrate materials. An electronic grade silane adhesion promoter, known as Prosil 9214, may be utilized as an alternative to the foregoing. It is also believed that an adequate silane adhesion promoter can be obtained from HULS America, Inc., under the trademark MiCrosi. The noted polyimide resin is preferable because of its high temperature characteristics, its low out-gassing properties and its high tensile strength, on the order of 20,000 psi.

The end of the pedestal tube 26 is dipped into the premixed bonding material and then placed onto the surface of the bottom glass substrate 16, in coaxial alignment with the hole 24, as shown in FIG. 3. During assembly, the trilevel transducer assembly 10 is actually inverted from that shown in FIG. 3, so that the weight of the pedestal tube 26 compacts the liquid bonding composition to a thin film on the surface of the glass substrate 16 surrounding the aperture 24. Depending on the weight of the component, it might be desirable to allow the transducer chip to rest upon the pedestal tube, or for an external pressure to be uniformly applied to the components to achieve the desired thickness of adhesive therebetween. For mass production, it is contemplated that the pedestal tube will not be dipped into the liquid adhesive, but rather will have a predefined volume of adhesive deposited thereon through a hollow needle or other similar instrument. By depositing a predefined amount of the adhesive on the end of the pedestal tube 26, and by resting the transducer 10 on the tube 26, the volume of adhesive at the joint can be closely controlled.

Importantly, the pedestal tube 26 is dipped in the bonding composition and applied to the transducer glass substrate surface before a film is developed over the exposed surface of the bonding composition. By placing the parts together while the polyimide adhesive is still in liquid form, fillets of adhesive are formed on the parts. When complete cured, the fillets (shown in FIG. 3) provide an enhanced bonding and mechanical support between the parts. Such a fillet cannot be formed by conventional polyimide bonding techniques where the adhesive has already undergone curing before the components are brought together.

Preferably, a thin film of the bonding composition 60 is formed between the annular end surface of the pedestal tube 26 and the glass substrate 16. Films as thin as 0.2-0.3 mil are desirable as such thickness is sufficient to provide an excellent bond, while yet minimizing the thermal expansive properties of the bonding composition 60. Because the thermal coefficient of expansion of the noted bonding composition 60 is about 4-5 times that of both the borosilicate glass of the pedestal tube 26 and the substrate 16, a very thin film of the bonding composition 60 minimizes dimensional changes therein, due to temperature, thus minimizing the overall effects of temperature changes on the bonded glass structures.

In accordance with another important feature of the bonding technique of the invention, the temperature of the bonded trilevel transducer 10 and pedestal tube 26 is allowed to remain at a low temperature for a substantially long period of time in order to allow the solvent to be removed from the composition by a slow natural diffusing process through the bonding composition solids. Preferably, during the solvent evolution stage, the bonded structure is left at a polyimide resin storing temperature of about 5° C. for a period of 10-15 hours. After such period of precuring time, it has been found that the solvent is sufficient removed from the bonding composition 60 such that no blistering or bubbles occur during a later elevated temperature curing process This significant advantage allows the parts to be initially placed together with the adhesive and later heated, without concern that an inferior bond will be formed due to the generation of bubbles within the bonding adhesives. After the 10-15 hour precuring stage, the bonding composition 60 is characterized by a "green" strength by which the trilevel transducer assembly 10 and the attached pedestal tube 26 can be handled and carried without risk of separation or damage to the bond interface.

The next step of the bonding process is carried out in a vacuum oven of the type adapted for providing elevated temperatures in vacuum conditions. Preferably, the vacuum need only be sufficient to remove out gassing elements from the bonding composition 60 when the temperature thereof is increased. During the stair step or ramped temperature schedule, as set forth in FIGS. 5 and 6, a thermoplastic bond is achieved between the glass pedestal 26 and transducer glass substrate 16. More specifically, the elevated temperature fully imidizes the polyimide adhesive and completes the formation of imide, rings along the polymer structure. This stage result in a bond which is characterized by a high tensile strength, sets the glass transition temperature, and yields excellent mechanical properties while yet being thermoformable.

Figure 5:
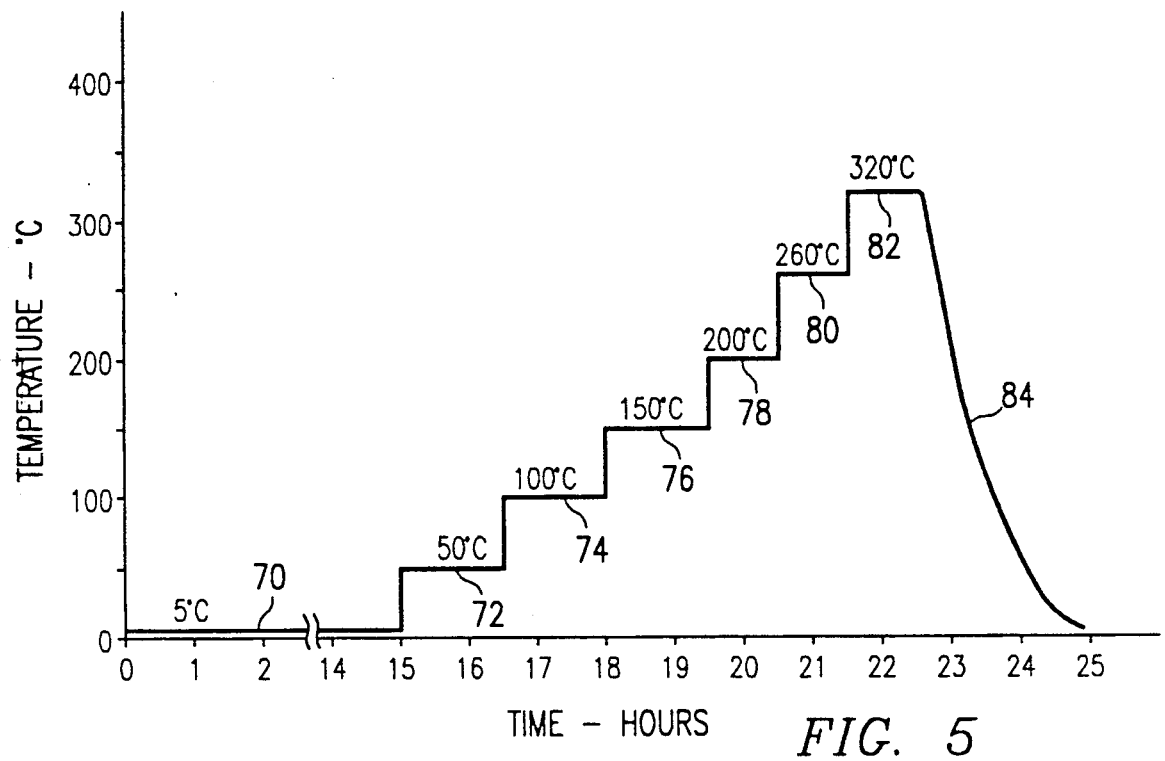
FIGS. 5 and 6 are graphical illustrations of the bonding temperatures employed in providing a high quality thermoplastic bond between the transducer wafer assembly and the pedestal tube.
Figure 6:
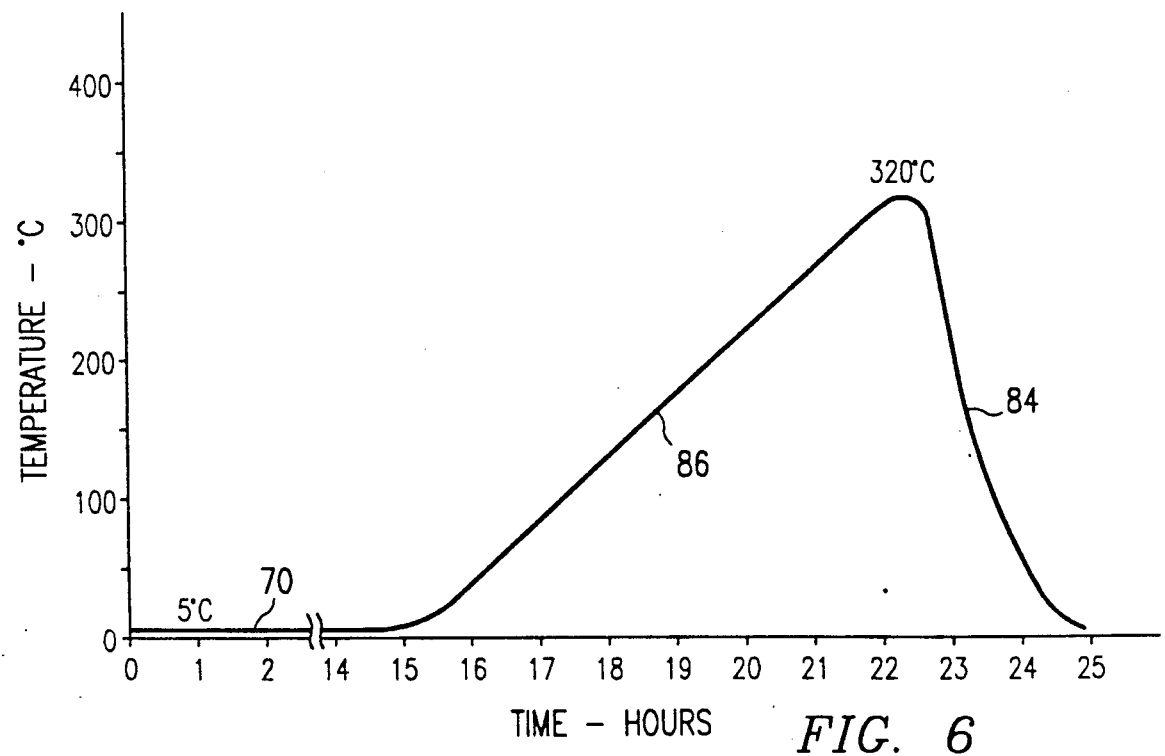

With reference now to FIG. 5, there is illustrated a temperature schedule for completely imidizing the bonding composition 60 into a thermoplastic material. The horizontal axis of the graph of FIG. 5 illustrates time, in hours, while the vertical axis illustrates temperature in degrees centigrade. Horizontal line 70 illustrates the 10-15 hours of precuring, at which time the bonding composition 60 is maintained at a below room temperature of about 5° C. Thereafter, the bonded trilevel transducer assembly 10 and attached pedestal tube 26 are elevated to a temperature of about 50° C. for one and one half hours. This is noted by line 72. Next, the oven is adjusted to provide stepped temperatures of 100° C. and 150° C. for one and one-half hour each, and then 200° C. for one hour. These temperature steps are shown by respective lines 74-78. A next temperature step of 260° C. for one hour, is shown by line 80. Finally, the temperature is elevated to 320° C. for one hour (line 82) When curing is completed, the bonded transducer and pedestal structure is allowed to return to room temperature, as indicated by line 84.

The bond achieved by the foregoing steps is extremely tough and reliable, even at high temperatures. The bond 60 also provides very low out gassing over the life of the bond. According to tests, the thermoplastic bond 60 formed according to the invention exhibits a high tensile strength, to such a degree that the glass pedestal 26 breaks before the thermoplastic bond 60 when destructive overpressures are coupled to the pedestal tube 26.

While the foregoing illustrates the temperature schedule for finally curing the bonding composition 60, it is not essential to elevate the oven temperature in the noted steps. For example, and with reference to FIG. 6, a continuously programmable vacuum oven can be utilized to provide a temperature increase in the nature of a ramp 86, up to about 300° C.-320° C., over a period of about 8 hours, and then returned to room temperature for completing assembly of the transducer.

After completing the thermoplastic bonding of the trilevel transducer structure 10 to the pedestal tube 26, a non-corrosive room temperature vulcanizer, such as RTV 3145, which is commercially available from Dow Corning, is applied to the upper inside surface of the header socket 28 and the lower end of the pedestal tube 26 inserted therein. The unit is then allowed to remain at room temperature, in a controlled humidity environment, for a sufficient period of time such as eight hours, for curing the RTV material.

With the trilevel transducer assembly 10 secured to the header 30, the unit is then clamped in a lead bonding machine such that the conductors 40 can be electrically connected between the feed through pins 36 and the appropriate contact surfaces on the trilevel transducer assembly 10. The bonding of the conductors 40 to the noted contacts and pins is then carried out. The bonding of conductors 40 to the contacts located at the corners of the transducer, assembly 10 is conducted without risk of breaking the thermoplastic bond 60 between the pedestal 26 and the transducer 10. As noted above, each conductor 40 includes sufficient length so as not to be placed in tension and thereby apply a stress to the trilevel transducer assembly 10. 1.5 mil aluminum conductors are adequate for providing an electrical connection between the feed through pins 36 and the trilevel transducer assembly 10.

Finally, the cover 42 is mounted to the header 30 so as to provide a hermetic seal to the trilevel transducer assembly 10 supported within the case 12. While the cover 42 can be mounted to the header 30 with a 3145 RTV material, it is preferable to secure the cover 42 to the header 30 by resistance welding techniques which are standard in the integrated circuit industry.

The encased transducer can then be fastened in a conventional socket adjacent an area in which fluid pressures are to be sensed. Differential fluid pressures can be coupled to the encased transducer using the tubular socket 28 and the conduit 24 for coupling different pressures to the transducer diaphragm 20. Based upon a difference in pressure, a corresponding capacitance will be generated by the transducer 10, which capacitance can be sensed by electronic circuits connected to the feed through pins 36. As a result, very small pressure changes can be sensed and converted into corresponding electrical signals for allowing a visual indication of the pressure, or for providing feedback or control signals so that the measured pressures can be controlled.

Figure 7:
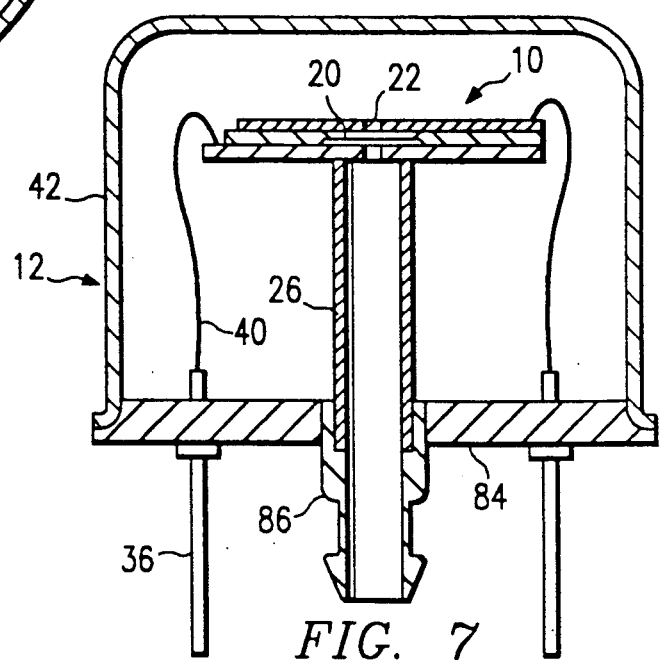
FIG. 7 illustrates an alternative embodiment of the invention.

In accordance with another transducer embodiment shown in FIG. 7, the case header 84 can be constructed with a single opening therein for communicating a fluid pressure by a socket 86 to the trilevel transducer assembly 10. In this embodiment, the trilevel transducer assembly 10 is bonded to the tubular pedestal 26 in the same manner noted above. However, during encasement of the cover 42 to the header 84, such operation is carried out in a predefined vacuum or pressure so that after encasement, the inside of the cover 42 is maintained at predetermined vacuum or pressure. Hence, the predefined vacuum or pressure is applied to the transducer diaphragm 20 via the top hole 22, while a variable pressure can be applied to the bottom side of the diaphragm 20 by way of the tubular socket 86 and pedestal 26. The tubular socket 86 is shown adapted for connection to a plastic tubing for conveying an external fluid pressure to the trilevel transducer assembly 10.

From the foregoing, disclosed is a transducer assembly and bonding technique providing a technical advantage of high reliability, strength, long term stability and a non-complicated fabrication technique. An additional technical advantage of the invention is that the parts to be bonded can be initially pressed together and left for a sufficient period of time, at a low temperature, to allow removal of the solvent by natural diffusion and thereby prevent the formation of surface bubbles or blisters during curing. Elevated temperatures, whether stepped or ramped, can then be employed to provide final imidizing of the bonding composition to form a high strength thermoplastic bond. An additional technical advantage of the invention is that by employing a thermoplastic bonding interface between the pedestal and the miniature trilevel transducer assembly, sufficient rigidity is obtained so that other assembly operations such as wire bonding, can be carried out to the contacts of the pedestal-mounted structure.

While the principles and concepts of the invention have been set forth above, it is to be understood that such structures and methods of fabrication thereof are not limited by this disclosure. Thus, while the preferred embodiment of the invention has been disclosed with reference to a specific assembly and bonding technique, it is to be understood that many changes in detail may be made as a matter of engineering choice without departing from the spirit and scope of the invention, as defined by the appended claims.

What is claimed is:

1. A method for bonding a glass tube to a glass surface of a transducer, comprising the steps of:
    applying a solvent-containing polyimide adhesive to a surface of said glass tube, said polyimide adhesive being at room temperature, or below when applied;
    placing the adhesive applied surface of said glass tube onto the glass surface of said transducer to form a composite structure;
    maintaining said composite structure at about room temperature or below, for a sufficiently long period of time to allow substantially all of the solvent to escape; and
    thereafter raising the temperature of the composite structure to a temperature sufficient to cure the polyimide adhesive to realize a substantially void-free thermosetting bond.

2. The method of claim 1, wherein a polyimide resin composition composed of the reaction product of 3, 3' -diaminobenzophenone and 3, 3', 4, 4' benzophenone tetracarboxylic acid dianhydride is employed as said adhesive.

3. The method of claim 1, further including maintaining said composite structure at a temperature of 5°-10° C. for about 10-15 hours for allowing escape of said solvent.

4. The method of claim 3, wherein the temperature raising step is carried out by raising the temperature of said composite structure in a vacuum oven at a low vacuum.

5. The method of claim 1, wherein after the solvent has substantially escaped, the temperature of said composite structure is raised over a period of about 3-8 hours to about 320° C. to cure the bond to a thermoplastic state.

6. The method of claim 1, further including bonding the glass tube to a transducer glass surface having a portion thereof covered with a metal conductor.

7. A method for bonding a transducer having an apertured glass layer, to a glass tube, comprising the steps of:
    coating a surface of the glass tube for the transducer glass layer with a liquid polyimide adhesive;
    applying a predetermined pressure between the glass tube and the transducer glass layer so that a thin layer of said adhesive is formed;
    maintaining the thin polyimide layer at room temperature, or below, for a period of time sufficient to allow substantially all of an adhesive solvent to evaporate; and
    elevating a temperature of the transducer and attached glass tube such that complete imidizing of the polyimide adhesive occurs.

8. The method of claim 7, further including bonding said transducer to said glass tube with an adhesive composition composed of the reaction product of 3, 3'-diaminobenzophenone and 3, 3', 4, 4' benzophenone tetra-carboxylic acid dianhydride.

9. The method of claim 8, further including employing said adhesive with an adhesion promoter.

10. The method of claim 7, further including allowing the thin layer of adhesive to remain at a temperature of about 5°-10° C. for about 10-15 hours to achieve said solvent evaporation.

11. The method of claim 7, further including elevating the temperature of said transducer and attached glass tube for a period of about 3-8 hours to a final temperature greater than about 300° C.

12. The method of claim 7, further including forming a thin layer of said adhesive of less than about 0.3 mil thickness.

13. A composite glass structure bonded in accordance with the method of claim 7.

14. A method for fabricating a transducer device, comprising the steps of:
coating at least one surface of a transducer assembly or a glass pedestal with an adhesive composition composed of the reaction product of 3, 3'-diaminobenzophenone and 3, 3', 4, 4' benzophenone tetra-carboxylic acid dianhydride;
resting the pedestal upon the transducer assembly so that a thin layer of said adhesive is formed therebetween;
maintaining the temperature of said adhesive at less than about 10° C. for a period of about 10-15 hours for allowing substantially all of an adhesive solvent to evaporate from said polyimide adhesive;
elevating the temperature of said transducer assembly and attached glass pedestal for a period of about 3-8 hours to a final temperature of greater than about 300° C.;
fixing said pedestal and attached transducer assembly to a base of a case;
forming at least one fluid inlet to said case;
bonding conductors between pins of said case and contact surfaces of said transducer assembly; and
hermetically sealing a cover to the base of said transducer case.

15. The method of claim 14, further including elevating said temperature by predefined increments over predefined intervals of time.

16. The method of claim 15, further including elevating said temperature to about 50° C. for about one and one half hours, then to about 150° C. for about one hour, then to about 200° C. for about one half hour, and then to about 270° C. for about one half hour.

17. The method of claim 15, further including linearly elevating said temperature over a period of about 3-8 hours.

18. A transducer structure bonded in accordance with the method of claim 14.

19. A method for assembling a transducer structure, comprising the steps of:
bonding a pedestal tube to a transducer assembly such that a channel is defined for communicating fluids to said transducer assembly;
fixing the pedestal tube in a base portion of a case having electrical feed through pins;
connecting conductors between said feed through pins and contact surfaces of said transducer assembly; and
hermetically sealing a cover to said case for encasing said transducer assembly.

20. The method of claim 19, further including connecting said conductors only to upper surface contacts of said transducer assembly.

21. The method of claim 19, further including bonding said transducer assembly to said pedestal tube, utilizing a polyimide adhesive composition composed of the reaction product of 3, 3'-diaminobenzophenone and 3, 3', 4, 4' benzophenone tetra-carboxylic acid dianhydride.

22. The method of claim 21, further including precuring said adhesive at room temperature, or below, for a period of time sufficient to allow solvent thereof to evaporate from said adhesive.

23. The method of claim 19, further including bonding said pedestal tube to a base portion of said case with an RTV material.

24. The method of claim 19, further including forming a second fluid communication conduit in said base for allowing said transducer assembly to operate in response to external differential fluid pressures.

25. The method of claim 19, further including sealing said cover on said base so that said transducer is encased within a predefined pressure.

26. The method of claim 19, further including pressing said pedestal tube against said transducer assembly to form an adhesive layer with a thickness of less than about 0.3 mil.

27. The method of claim 26, further including forming said adhesive layer thickness by resting said pedestal tube on said transducer assembly and allowing the weight of said pedestal tube to squeeze said adhesive to said thickness.

28. A transducer structure assembled in accordance with the method of claim 19.

29. A method for bonding a transducer assembly to a pedestal tube, comprising the steps of:
applying a polyimide adhesive at room temperature or below, to a surface of said transducer assembly or to said pedestal tube;
resting said pedestal tube on said transducer assembly to form a thin layer of said adhesive therebetween;
maintaining said polyimide adhesive layer at said low room temperature or below until substantially all of an adhesive solvent has evaporated therefrom; and
elevating the temperature of said adhesive layer sufficient to imidize said polyimide adhesive and securely bond said pedestal tube to said transducer assembly.

30. The method of claim 29, further including maintaining said thin layer of polyimide adhesive at a temperature below about 10° C.

31. The method of claim 30, further including refrigerating said transducer assembly, pedestal tube and thin layer of polyimide adhesive at a temperature of about 5° C.

32. The method of claim 29, further including forming a thin layer of adhesive of less than about 0.3 mil between said pedestal tube and said transducer assembly.

33. A transducer structure bonded according to the method of claim 29.

34. A method for assembling transducer parts together, comprising the steps of:
applying a liquid polyimide adhesive to one or the other of a transducer chip and one end of a pedestal tube;
placing the parts together by butting the one end of the pedestal tube against a planar surface of the transducer chip while the polyimide adhesive is yet a liquid so that a fillet of the adhesive is formed on a sidewall of the other of the chip or tube;

allowing the polyimide adhesive to remain at a low temperature until a solvent therein is substantially removed; and elevating the temperature so that imidizing of the polyimide occurs.

35. The method of claim 34, further including applying a force to the parts while the adhesive is in a liquid form to define a thin layer of said adhesive.

36. The method of claim 34, further including adhering the transducer chip to a pedestal tube so that fillets of said adhesive form on said pedestal tube.

37. The method of claim 34, further including allowing the weight of one said part to press on the liquid adhesive to form a desired thickness thereof.

38. The method of claim 34, further including adhering the other end of the pedestal tube to a casing header so that the transducer is supported within an encased part of a casing by the pedestal tube.

39. A transducer structure, comprising:
a transducer assembly having an apertured face;
a pedestal tube mounted to said transducer assembly face so as to provide a fluid channel to said aperture; and
a polyimide adhesive film between said pedestal tube and said transducer assembly, said adhesive film being less than about 0.3 mil in thickness.

40. The transducer structure of claim 39, further including fillets of said adhesive formed on sidewall surfaces of said pedestal tube.

41. The transducer structure of claim 39, wherein said pedestal tube and a surface of said transducer assembly which contacts said adhesive film are both made of glass.

* * * * *